No. 11,252. PATENTED JULY 11, 1854.
J. M. THOMPSON.
PARALLEL MOTION FOR BEAM ENGINES.

Witnesses.
Alexander Thompson
Robert Wylie

Inventor.
John M Thompson

UNITED STATES PATENT OFFICE.

JOHN M. THOMPSON, OF TAUNTON, MASSACHUSETTS.

PARALLEL MOTION FOR BEAM-ENGINES.

Specification of Letters Patent No. 11,252, dated July 11, 1854.

*To all whom it may concern:*

Be it known that I, JOHN M. THOMPSON, of Taunton, in the county of Bristol and State of Massachusetts, have invented a new and useful Improvement in the Parallel Motion for Beam-Engines; and I do hereby declare that the following is a full, clear, and exact description of the same, reference being had to the accompanying drawings, forming part of this specification, in which—

Figure 1:
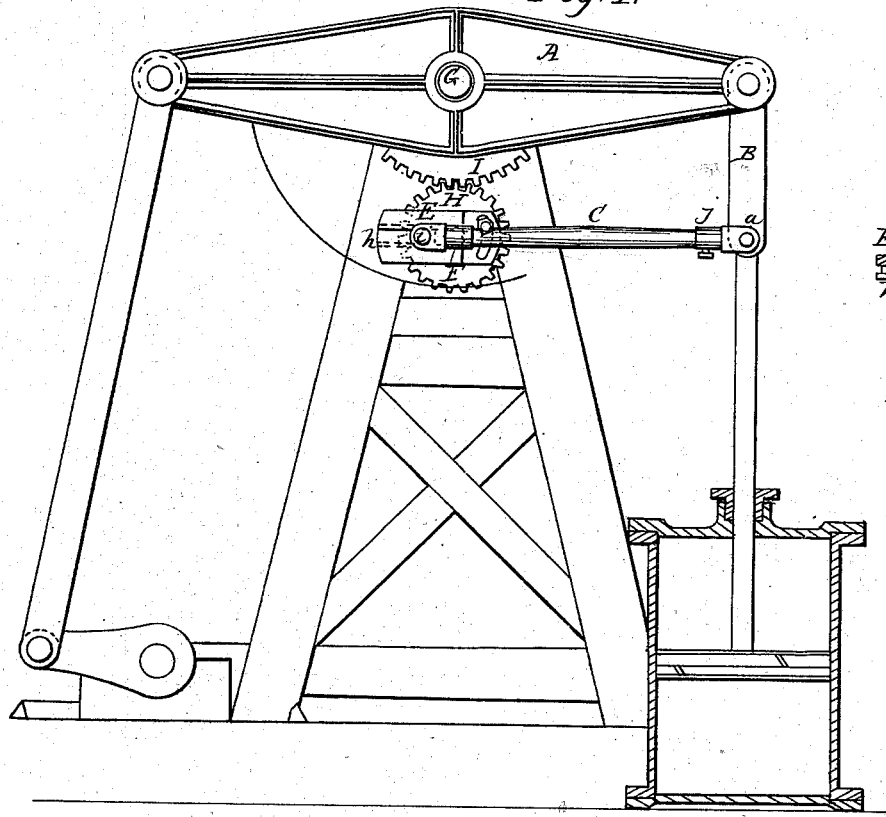
Figure 2:
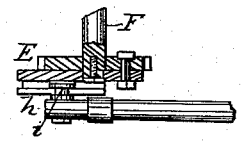
Figure 3:
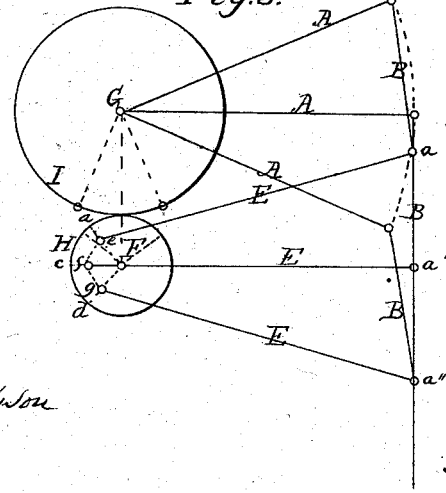

Figure 1, is a side elevation of the principal working parts of a beam engine, with my improved parallel motion applied. Fig. 2, is a section of a part of the parallel motion. Fig. 3, is a diagram, illustrative of the working of the motion.

Similar letters of reference indicate corresponding parts in the several figures.

This invention consists in connecting one end of the radius rod to the piston rod link, and the other to a crank or arm on a rock shaft, which is placed under the center of, and receives a rocking motion by being geared with the beam.

To enable those skilled in the art, to make and use my invention, I will proceed to describe its construction and operation.

A, is the beam of the engine; B, the piston rod link; C, the radius rod, connecting at one end with the piston rod by the pin, $a$, which connects the latter with the link.

E, is the arm or crank, with which the other end of the radius rod is connected; and F, the shaft upon which the arm or crank, D, rocks. The axis of the shaft, F, is fixed directly below the center, G, of the beam; and, at a distance from the said center, equal to the length of the link, B. The shaft, F, carries a spur toothed wheel, H, which, if the shaft rocks, is secured to it; but if the shaft is fixed, the wheel and arm or crank, E, are secured together, and are loose on the shaft.

The beam has attached to it a toothed segment, I, which gears with the wheel, H, and communicates to it and the arm or crank, E, a rocking motion. The proportionate lengths of the radii of the wheel, H, and the segment, I, are quite immaterial, but upon these lengths will depend the length of the arm or crank, E, and that of the radius rod, C, which may be determined by making a diagram of the movements of the beam, the link, B, the segment, I, and the wheel, H, as shown in Fig. 1 and marking out the radius lines, $b$, $c$, $d$, which indicate the movements of a radius of the wheel, H, which would be in line with the radius rod, when the latter is at the center of its movement, or in a horizontal position; and then from the points, $a$, $a'$, $a''$, with a distance sufficient to cut the lines, $b$, $c$, $d$, all in the same arc described from the center, F, of the wheel H, setting off, on the said lines, the points, $e$, $f$, $g$. The above distance will be the length of the radius rod, and F $e$, F $f$, F $g$, will be of the length of the crank or arm, E.

In order to set out the radius rod and crank or arm to the proper length without difficulty, I make the arm, E, with a slot, $h$, see Figs. 1 and 2, to receive the pin, $i$, which connects the radius rod to it, and make one head, $j$, of the radius rod adjustable, to alter the length of the rod. This allows the lengths of the arm and rod to be altered till the movement of the point, $a$, is rectilinear.

Instead of the segment, I, an internal toothed segment described from G, as shown by a red line in Fig. 1, may be used, or a straight rack pivoted at one end to the beam, and kept in gear with the wheel, H, by a link hung on the shaft, F.

What I claim as my invention, and desire to secure by Letters Patent, is—

Producing a parallel motion, by connecting the link, B, to one end of a radius rod, whose other end is attached to a crank or arm, E, on a rock-shaft, F, placed under the center of the beam, and receiving a motion from the same, by gearing, substantially as described.

JOHN M. THOMPSON.

Witnesses:
ALEXANDER THOMPSON,
ROBERT WYLIE.